United States Patent
Kahn et al.

(10) Patent No.: US 7,086,420 B2
(45) Date of Patent: Aug. 8, 2006

(54) MULTILAYERED ELASTOMER HOSE WITH REINFORCEMENT LAYER CONSISTING OF SULFUR-CONTAINING POLYMER MATERIAL

(75) Inventors: Peter Kahn, Erlensee (DE); Martin Bruck, Weilrod (DE)

(73) Assignee: Veritas AG, Gelnhausen (DE)

( * ) Notice: Subject to any disclaimer, the term of this patent is extended or adjusted under 35 U.S.C. 154(b) by 0 days.

(21) Appl. No.: 11/089,357

(22) Filed: Mar. 25, 2005

(65) Prior Publication Data
US 2005/0211327 A1   Sep. 29, 2005

(30) Foreign Application Priority Data
Mar. 26, 2004   (DE)   ...................... 10 2004 014 997

(51) Int. Cl.
*F16L 11/00*   (2006.01)
(52) U.S. Cl. ..................... 138/125; 138/124; 428/36.2; 428/36.91; 428/36.3
(58) Field of Classification Search ........ 138/123–126; 428/36.1, 36.2, 36.3, 36.9, 36.91
See application file for complete search history.

(56) References Cited

U.S. PATENT DOCUMENTS

| | | | | |
|---|---|---|---|---|
| 4,755,570 A | * | 7/1988 | Hefner, Jr. ................... | 525/529 |
| 4,800,113 A | * | 1/1989 | O'Connor .................... | 428/175 |
| 4,883,552 A | * | 11/1989 | O'Connor et al. .......... | 156/180 |
| 5,048,441 A | * | 9/1991 | Quigley ........................ | 114/90 |
| 5,437,899 A | * | 8/1995 | Quigley ..................... | 428/35.7 |
| 5,556,677 A | * | 9/1996 | Quigley et al. ............. | 428/36.2 |
| 5,851,930 A | | 12/1998 | Bessey et al. ................ | 442/60 |
| 6,129,962 A | * | 10/2000 | Quigley et al. ............. | 428/36.1 |
| 2001/0018933 A1 | | 9/2001 | Martucci et al. ............ | 138/125 |

FOREIGN PATENT DOCUMENTS

EP     0 818 477 A1     1/1998

\* cited by examiner

*Primary Examiner*—Patrick Brinson
(74) *Attorney, Agent, or Firm*—Buchanan Ingersoll PC

(57) ABSTRACT

The present invention relates to a multilayered elastomer hose comprising at least an inner layer, an outer layer and a reinforcement layer. To enhance the loadability of conventional elastomer hoses while maintaining the typical flexible structure, it is intended according to the invention that the reinforcement layer comprises a sulfur-containing polymer material.

14 Claims, 3 Drawing Sheets

MULTILAYERED ELASTOMER HOSE WITH REINFORCEMENT LAYER CONSISTING OF SULFUR-CONTAINING POLYMER MATERIAL

CROSS REFERENCE TO RELATED APPLICATIONS

This application claims priority under 35 U.S.C. §119 to German Application No. 10 2004 014 997.6 filed Mar. 26, 2004, the entire contents of which is hereby incorporated by reference in their entirety.

BACKGROUND

The present invention relates to a multi-layered elastomer hose.

Such an elastomer hose for transporting liquids is e.g. known from EP 0 818 477 A1.

Such elastomer hoses are preferably used in the automobile sector for transporting liquids, such as fuels or hydraulic fluids, and are inter alia exposed to great climatic and thermal loads. To withstand various mechanical stresses, such as internal pressure, tension, bending, folding behavior and torsion, and to ensure a good crash behavior, the elastomer hoses are reinforced in various ways. For instance, for reinforcing such elastomer hoses, steel wires for high-pressure and extreme-pressure loads are used, or yarn materials. Known are inter alia cotton, modal twisted yarn, Reyon, polyester, m-aramid and p-aramid. The used yarn materials may here differ from one another in their mechanical, thermal and chemical properties and decisively influence the quality of the elastomer hoses reinforced therewith.

It has been the inventor's object to enhance the loadability of conventional elastomer hoses while maintaining the typical flexible structure.

SUMMARY

A sulfur-containing polymer material is disclosed which is embedded into the reinforcement layer. Polymer materials containing sulfur bridges (—S—) may e.g. be employed. A class of said last-mentioned materials are polyarylene sulfides. Polyarylene sulfides in the broadest sense are linear, branched or cross-linked polymers containing arylene sulfide units. Polyarylene sulfides and their preparation are e.g. described in "Ullmann's Encyclopedia of Industrial Chemistry", Volume A21, B. Elvers, S. Hawkins and G. Schulz (Eds.), VCH, Weinheim-New York 1992, S. 463–472, which is herewith referred to and incorporated herein by reference in its entirety. Preferred polyarylene sulfides are polyarylenethioethers with recurring units of the formula:

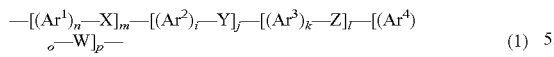

(1)

wherein $Ar^1$, $Ar^2$, $Ar^3$, $Ar^4$ and W, X, Y und Z, respectively, independently of one another, are the same or different, the indices n, m, i, j, k, l, o and p, independently of one another, are zero or integers 1, 2, 3 or 4, wherein the sum is at least 2, $Ar^1$, $Ar^2$, $Ar^3$ and $Ar^4$ are arylene units with 6 to 18 C atoms, and W, X, Y and Z represent bivalent linkage groups, selected from —$SO_2$—, —S—, —SO—, —CO—, —O—, —COO— or alkylene or alkylidene groups with 1 to 6 C atoms, and at least one of the linkage groups W, X, Y or Z consists of —S—. The arylene units $Ar^1$, $Ar^2$, $Ar^3$ und $Ar^4$ may optionally be substituted or unsubstituted.

Preferred arylene systems are phenylene, biphenylene, naphthylene, anthracene and phenanthrene. Advantageously, the polyarylene sulfide contains at least 30 mol-%, preferably at least 50 mol-%, and particularly at least 70 mol-%, arylene sulfide units. Preferred polyarylene sulfide is polyphenylene sulfide (PPS). In general, said sulfide contains at least 50 mol-%, and particularly at least 70 mol-%, phenylene sulfide units and is e.g. known under the names Fortron® and Ryton®.

PPS is characterized by its high thermal resistance at operating temperatures of up to 240° C. and by its very high resistance to chemicals. In particular, this material is extremely stretchable. Thus the elastomer hose according to the invention exhibits an almost linear volume increase upon rise in the ambient pressure. For instance, impulses which are introduced by the rise in pressure of a conveyed medium into the hose according to the invention can be absorbed in a better way than in conventional elastomer hoses reinforced with standard materials. Due to the volume increase of the hose according to the invention the impulses are reduced and the downstream units are less stressed.

In a particularly advantageous variant, the reinforcement layer comprises at least one reinforcement fiber or at least one reinforcement yarn with the sulfur-containing polymer material. Reinforcement fibers/yarns can be produced and processed easily and exhibit excellent elongation properties in fiber direction. With a corresponding selection of the further fiber components and the fiber thickness, the reinforcement layer can be adapted to the individual requirement of the respective elastomer hose, and the flexibility of the elastomer hose can be increased.

Moreover, it has turned out to be advantageous when reinforcement fibers or reinforcement yarns are entwined with one another at least in part. A flexible braiding can thus be incorporated into the reinforcement layer. Such entwined fiber constructions are strong enough to withstand the most frequently occurring stresses. Moreover, such an entwined structure of the reinforcement fibers or the reinforcement yarns can be achieved rapidly and in a cost-efficient manner. The entwined reinforcement fiber structures are extremely stretchable and can be adapted to all required shapes. Moreover, due to the selection of the entwined pattern, an even greater range of application is achieved because the properties of the fiber reinforcement can thereby be adapted individually to the requirements of the multilayered elastomer hose to be finished. The most important influencing parameters are the density of the stitches and the fiber thickness.

In a further advantageous embodiment, the inner layer of the multilayered elastomer hose is spirally surrounded at least in sections by the reinforcement fiber or the reinforcement yarn. The elongation properties of the reinforcement fiber or the reinforcement yarn are enhanced by slightly twisting the reinforcement fiber or the reinforcement yarn while spinning around the inner tube.

Furthermore, it has turned out to be particularly advantageous when the inner tube is spirally spun around in several layers. A spiral spinning around the inner layer is particularly suited for use with elastomer hoses having a high dimensional stability and great bending radii.

It has turned out to be advantageous when the diameter of the reinforcement fiber or the reinforcement yarn is preferably less than 30 µm, preferably 12–15 µm. The use of a great number of relatively thin reinforcement fibers or yarns improves the elongation properties in comparison with the use of a small number of thicker reinforcement fibers or yarns (at an approximately constant overall cross-section of all reinforcement fibers or yarns).

BRIEF DESCRIPTION OF THE DRAWINGS

The structure of a multilayered elastomer hose according to preferred embodiments, with a reinforcement layer comprising a sulfur-containing polymer material will now be described with reference to the attached drawings.

DETAILED DESCRIPTION

Figure 1:
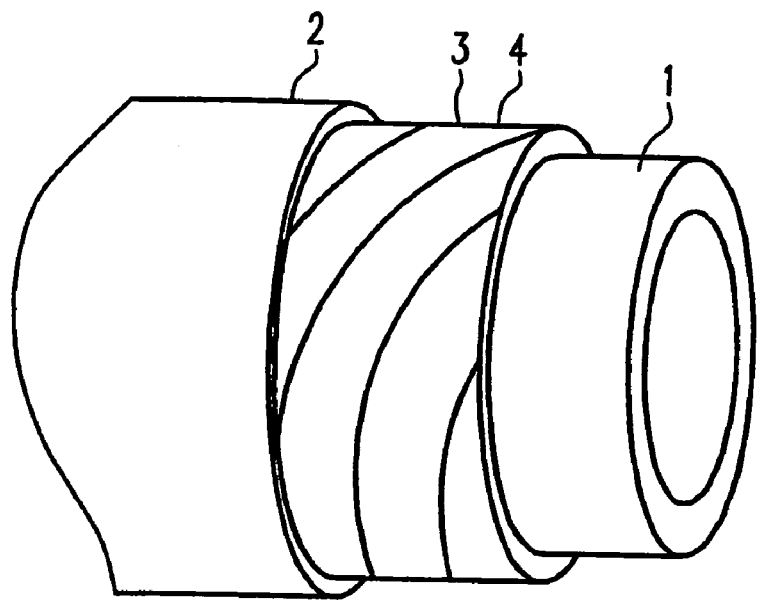
FIG. 1 is an overall view showing the multilayered elastomer hose of the invention with inner layer, outer layer and interposed reinforcement layer having a PPS reinforcement fiber.

FIG. 1 is a cut-open view of a multilayered elastomer hose of the invention, the hose consisting of an inner layer 1, an outer layer 2 and an interposed reinforcement layer 3 which comprises a sulfur-containing polymer material 4. The inner layer 1 and the outer layer 2 consist of any desired elastomer-containing materials that are suited for conveying the medium to be respectively transported in an optimum way. The reinforcement layer 3 with the sulfur-containing polymer material 4 contains further constituents, inter alia binding materials to interconnect the inner layer 1 and the outer layer 2 and to fix the reinforcing material. The preferred materials for the inner and outer layers 1, 2 and the further components of the reinforcement layer shall here not be discussed in more detail because the trained person skilled in the art will have no difficulties in determining a multitude of suitable materials and in combining these in an appropriate way.

Polymer materials which comprise sulfur bridges (—S—), e.g. the polyarylene sulfides, are suited for use in the reinforcement layer. As has been mentioned above, the polyarylene sulfides are in the broadest sense linear, branched or cross-linked polymers containing at least 30 mol percent arylene sulfide units. Preferred arylene systems are phenylene, biphenylene, naphthylene, anthracene and phenanthrene. The preferred polyarylene sulfide is polyphenylene sulfide (PPS) which in general contains at least 50 mol percent, and particularly at least 70 mol percent, phenylene sulfide units.

In the illustrated embodiment in FIG. 1, a PPS yarn is incorporated as a reinforcement fiber into the reinforcement layer 3 and surrounds the inner layer 1 in spiral or helical fashion. PPS is normally delivered as a powder or granulate. The unreinforced granulate is suited for filament or fiber production and especially for extrusion and injection molding processing. Thanks to the addition of glass fibers and glass fiber/mineral mixtures, the stiffness and the heat deflection temperature of the unreinforced material can be raised considerably. A fiber material may contain up to about 40 weight percent reinforcing substances and may have a density of about 1.3 to about 2.2. g/cm$^3$. At a temperature of 23° C. and a relative humidity of 50% the tensile strength of a reinforced granulate is about 150 to 200 MPa, the elongation at break about 100 to 200% and the modulus of elasticity in tension about $10*10^3$ MPa to $20*10^3$ MPa (testing method: ISO 527 Part 1 and 2), wherein the measurement of the tensile strength and of the elongation at break is based on a test speed of 5 mm/min. The maximum heat deflection temperature (HDT/A) at 1.8 MPa reaches about +270° C. and (HDT/C) at 8.0 MPa about +220° C. (ISO 75 Part 1 and 2). The linear expansion coefficient (in longitudinal and transverse direction) is about 20 to $30*10^{-6}$ C.$^{-1}$ in the temperature range of −50° C. to +90° C., and about 35 to $50*10^{-6}$ C.$^{-1}$ in the temperature range between +90° C. and +250° C. (testing method: ISO 11359-2).

In theory, the thickness of the reinforcement fiber 4 can be chosen at will to give the multilayer hose specific characteristics. The diameter of the reinforcement fibers is preferably less than 30 μm, preferably 12–15 μm. Likewise, the spiral pitch of the reinforcement fiber is freely selectable. The reinforcement fiber 4 can be wound so tightly around the inner layer 1 of the multilayer hose that the individual windings of the reinforcement fiber 4 adjoin and contact one another. The reinforcement fiber 4 may also be wound in several superimposed layers. For the purpose of a better illustration of the inventive idea FIG. 1 shows an exaggeratedly large reinforcement fiber 4 with exaggerated spiral pitch and exaggeratedly large distance.

Figure 2:
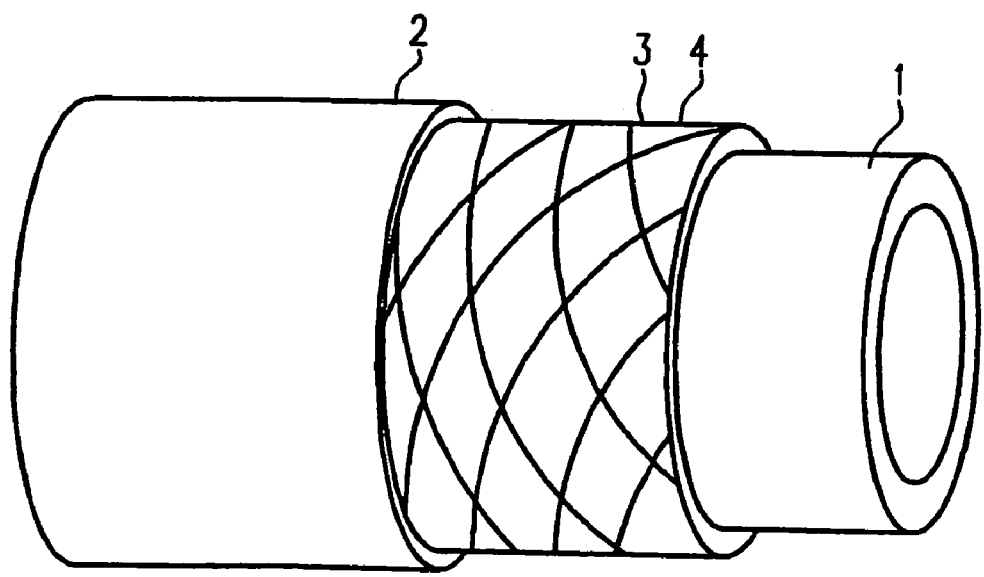
FIG. 2 is a further overall view showing the multilayered elastomer hose of the invention with inner layer, outer layer and interposed reinforcement layer containing an entwined network of reinforcement fibers.

FIG. 2 shows a second embodiment of the multilayered elastomer hose with an inner layer 1, an outer layer 2 and an interposed reinforcement layer 3 with reinforcement fibers 4. The size ratios are here also shown on an exaggerated scale for the purpose of a better illustration. Like in the first embodiment, the reinforcement fiber is a polyphenylene sulfide (PPS) yarn. Two different reinforcement yarns surround the inner layer 1 in a spiral with opposite pitch. This can further improve the reinforcing properties of the reinforcement layer 3.

In a particularly preferred embodiment, the reinforcement fibers 4 are entwined with one another, so to speak forming an "entwined hose" inside the reinforcement layer 3 that surrounds the inner layer 1. Desired strength/flexibility properties can be achieved by selecting specific entwining patterns and can selectively be adapted to the needs of the respective multilayered elastomer hose.

The trained person skilled in the art will always be able without any further instructions to manufacture one or several reinforcement fiber(s) and to process these in a multilayered elastomer hose, individually or as an entwined braiding, within the meaning of the present invention. Special manufacturing and processing methods shall therefore not be discussed here.

The use of such a multilayered elastomer hose and the resulting advantages will be described in the following with reference to FIGS. 3 and 4.

Figure 3:
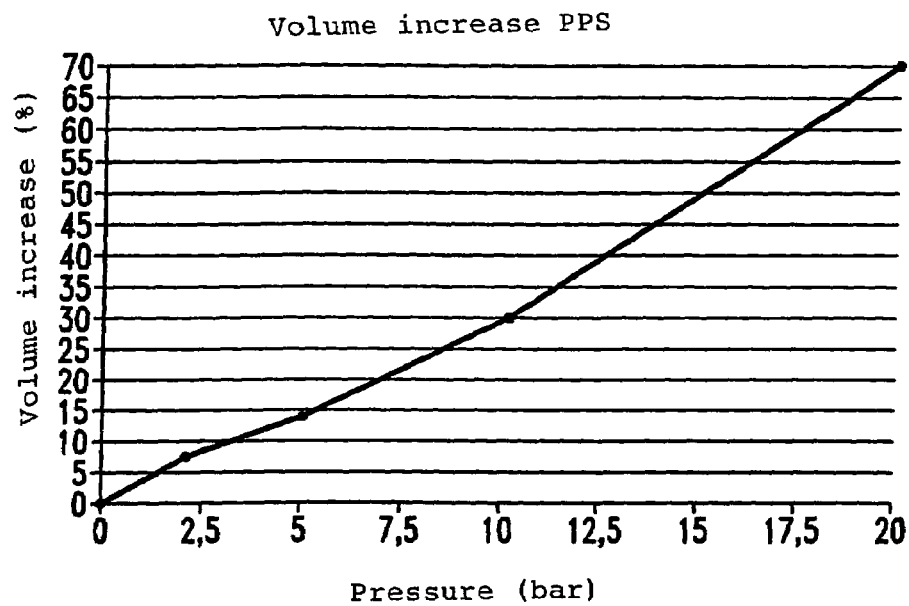
FIG. 3 shows the volume increase of a multilayered elastomer hose of the invention with a PPS yarn as the reinforcement fiber upon rise in the internal pressure as compared with the external pressure within a pressure range of 0 to 20 bar.

FIG. 3 shows the volume increase of an elastomer hose reinforced with a PPS yarn as the reinforcement fiber in a built-in situation upon rise in the internal pressure as compared with the external pressure (hereinafter called internal overpressure) within a pressure range of 0 to 20 bar. As can be determined in experiments, the volume of the elastomer hose with a PPS yarn as the reinforcement fiber increases almost linearly upon a rise in the internal pressure within the range of 0 to 20 bar. At an internal overpressure of 14 bar the volume of a multilayered elastomer-hose of the invention with a PPS yarn as the reinforcement fiber is about 30% to 35% larger than in the comparative state at the same internal and external pressure. At an internal overpressure of 20 bar, the same hose has a volume which is 70% larger than in the above-mentioned comparative state.

Figure 4:
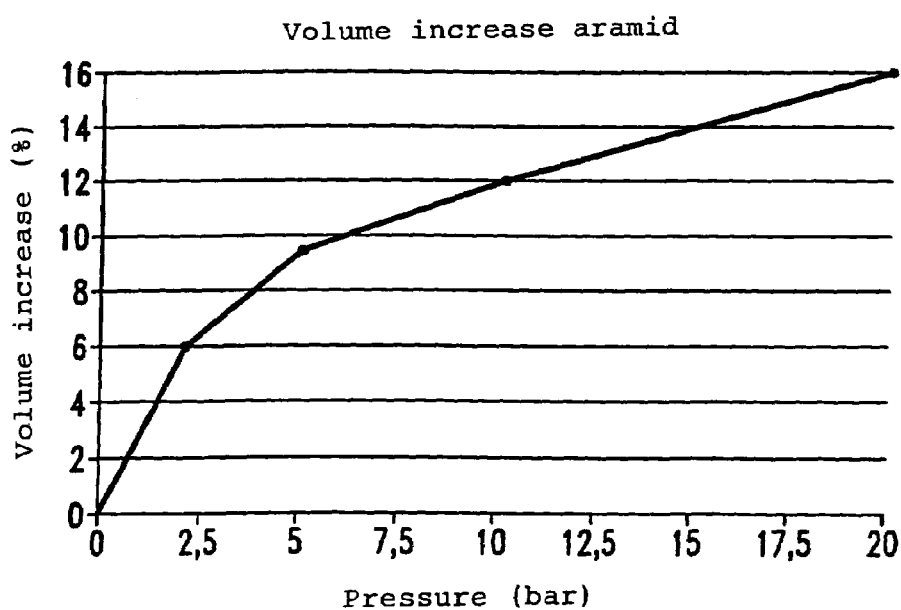
FIG. 4 shows the volume increase of a conventional elastomer hose with an aramid yarn as the reinforcement fiber upon rise in the internal pressure as compared with the external pressure within a pressure range of 0 to 20 bar.

FIG. 4 shows the volume increase of a conventional multilayered elastomer hose reinforced with an aramid yarn as the reinforcement fiber in a built-in situation at a rise in the internal pressure as compared with the external pressure within a pressure range of 0 to 20 bar. In the conventional elastomer hose the volume increases at an internal overpressure of up to 2 bar to a similar extent as in the elastomer hose according to the invention. Upon a further increase in the internal overpressure the volume of the conventional aramid-reinforced elastomer hose will increase only slightly. At an internal overpressure of 10 bar, the volume of the conventional elastomer hose is 12% larger than in the comparative state at the same internal and external pressure. At an internal overpressure of 20 bar the volume of the conventional elastomer hose has increased by 16% relative to the comparative state.

Figure 5:
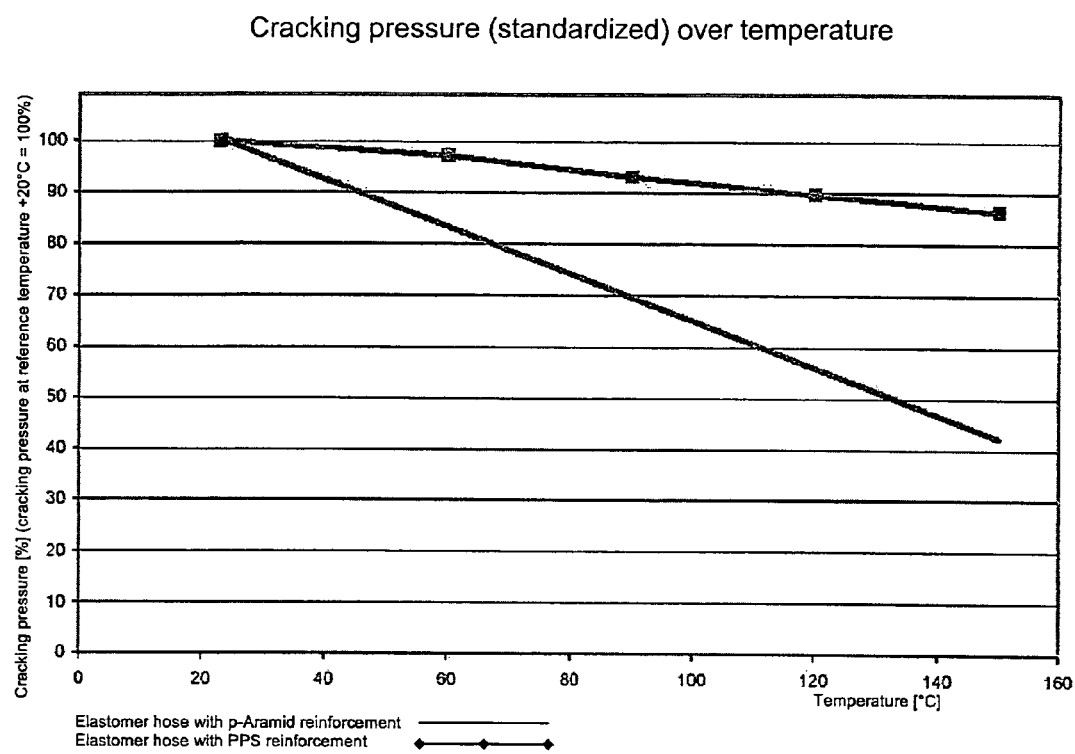
FIG. 5 shows a standardized illustration of the dependency of the crack pressure from the temperature by comparing an Elastomer hose with a p-Aramid reinforcement and an Elastomer hose with a PPS reinforcement.

FIG. 5 shows a standardized illustration of the dependency of the crack pressure from the temperature by comparing an Elastomer hose with a p-Aramid reinforcement and an Elastomer hose with a PPS reinforcement. The standardized illustrations are based on experimental tests carried out on substantially identical, reinforced Elastomer hoses, which distinguish from each other only in terms of the reinforcing material. Eventual temperature dependent effects, which are not related to the reinforcing material, are thereby eliminated. The reference quantity i.e. the reference value regarding the illustrated cracking pressure performance of the two reinforced Elastomer hoses is the respective cracking pressure of the hoses at a temperature of +20° C. The cracking pressures at higher temperatures are given in relation to the respective cracking pressure of the corresponding Elastomer hose at +20° C. in percent. The absolute quantity of the cracking pressure can be adjusted upwardly or downwardly by means of the thickness of the reinforcement layer. However, what matters here is the decrease of the relative cracking pressure with increasing temperature.

The continuous line illustrates the cracking pressure of the p-Aramid reinforced Elastomer hose, which decreases approximately linearly with increasing temperature and which amounts to only 42% of the reference value at a temperature of +150° C. In regard of the reference value, the cracking pressure of the p-Aramid reinforced Elastomer hose drops with increasing temperature per degree Celsius by about 0.48%.

The line marked with square spots illustrates the cracking pressure of the PPS reinforced Elastomer hose, which also decreases approximately linearly with increasing temperature but which still amounts to 87% of the reference value at a temperature of +150° C. In regard of the reference value, the cracking pressure of the PPS reinforced Elastomer hose drops with increasing temperature per degree Celsius by about 0.11%.

While the p-Aramid reinforced Elastomer hose reveals an obvious decrease of the cracking pressure over the temperature, the cracking pressure performance of the PPS reinforced Elastomer hose is nearly independent from the temperature.

This difference in the volume increase upon a rise in pressure in the comparison made between a multilayered elastomer hose of the invention and a conventional one entails the advantage according to the invention that the impulses in the hose according to the invention upon a rise in pressure in the hose are reduced by a volume increase, and the subsequent units are not loaded. This is e.g. also true for noise loads. A conventional aramid-reinforced elastomer hose does not show this linear characteristic line and can no longer expand upon a rise in the internal pressure; hence, the impulse due to a rise in pressure is passed on to the downstream units.

The invention claimed is:

1. A multilayered elastomer hose comprising at least an inner layer, an outer layer and a reinforcement layer, wherein the reinforcement layer comprises polyarylene sulfide having arylene units selected from one or more of: phenylene, biphenylene, naphthylene, anthracene or phenanthrene.

2. The multilayered elastomer hose according to claim 1, wherein the polyarylene sulfide contains more than 50 mol percent arylene sulfide units.

3. The multilayered elastomer hose according to claim 1, wherein the reinforcement layer contains polyphenylene sulfide.

4. The multilayered elastomer hose according to claim 1, wherein the reinforcement layer contains at least one reinforcement fiber or at least one reinforcement yarn with the sulfur-containing polymer material.

5. The multilayered elastomer hose according to claim 1, wherein the reinforcement layer contains at least one reinforcement fiber or at least one reinforcement yarn of the sulfur-containing polymer material.

6. The multilayered elastomer hose according to claim 5, wherein the reinforcement fibers or reinforcement yarn are entwined with one another at least in part.

7. The multilayered elastomer hose according to claim 1, wherein the reinforcement layer is positioned at least in sections between the inner layer and the outer layer.

8. The multilayered elastomer hose according to claim 5, wherein the reinforcement fiber or the reinforcement yarn spirally surrounds the inner layer at least in sections.

9. The multilayered elastomer hose according to claim 1, wherein the reinforcement layer contains polyphenylene sulfide.

10. The multilayered elastomer hose according to claim 9, wherein the reinforcement layer contains at least one reinforcement fiber or at least one reinforcement yarn with the sulfur-containing polymer material.

11. The multilayered elastomer hose according to claim 10, wherein the reinforcement layer contains at least one reinforcement fiber or at least one reinforcement yarn of the sulfur-containing polymer material.

12. The multilayered elastomer hose according to claim 11, wherein the reinforcement fibers or reinforcement yarn are entwined with one another at least in part.

13. The multilayered elastomer hose according to claim 12, wherein the reinforcement layer is positioned at least in sections between the inner layer and the outer layer.

14. The multilayered elastomer hose according to claim 8, wherein the reinforcement fiber or the reinforcement yarn spirally surrounds the inner layer at least in sections.

* * * * *